Patented Apr. 22, 1924.

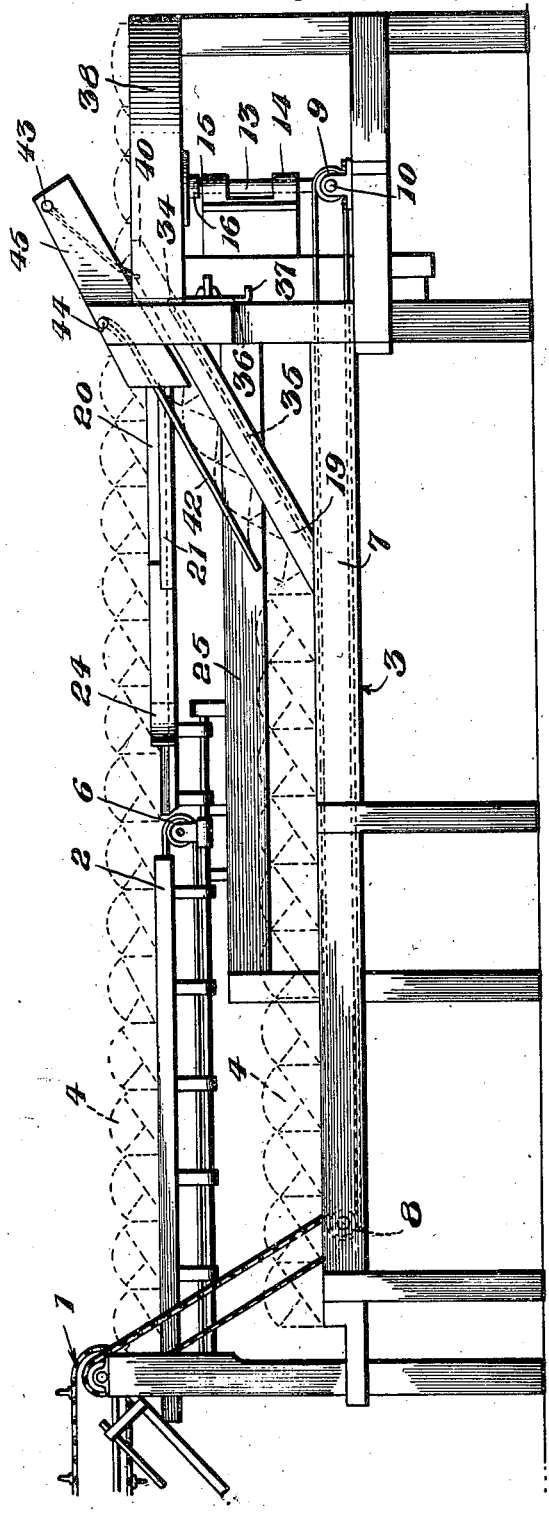

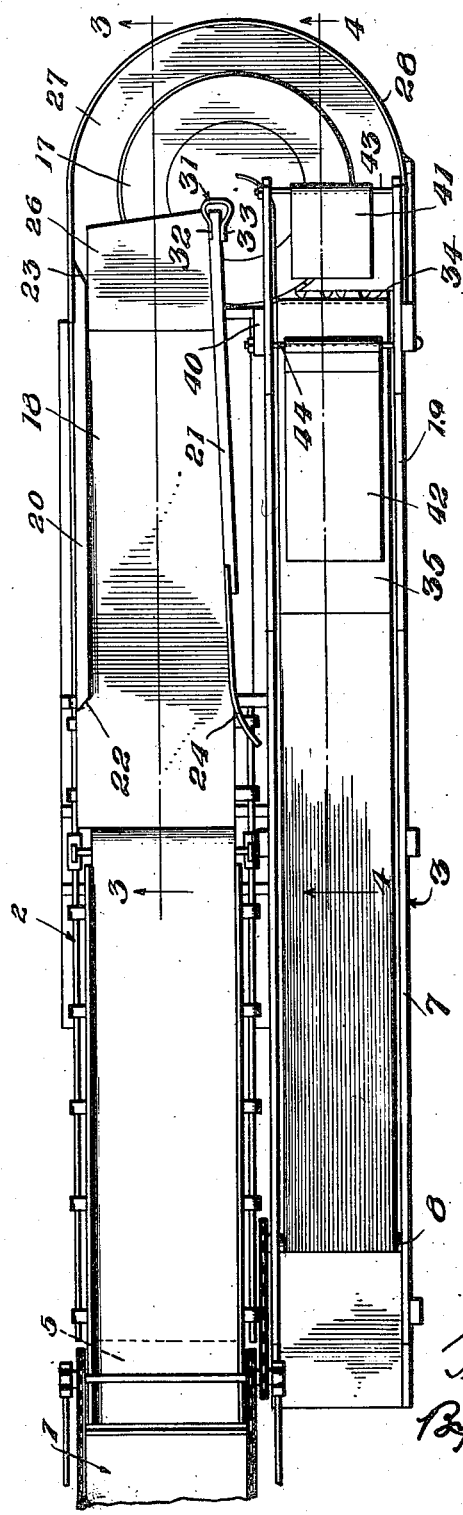

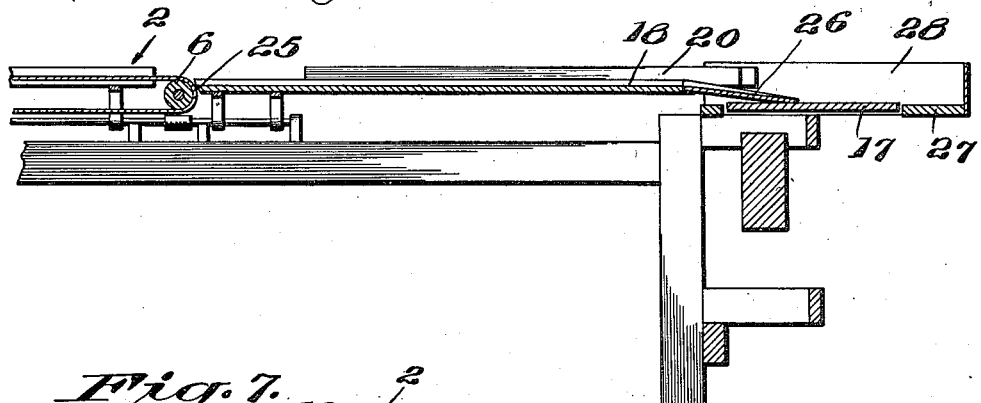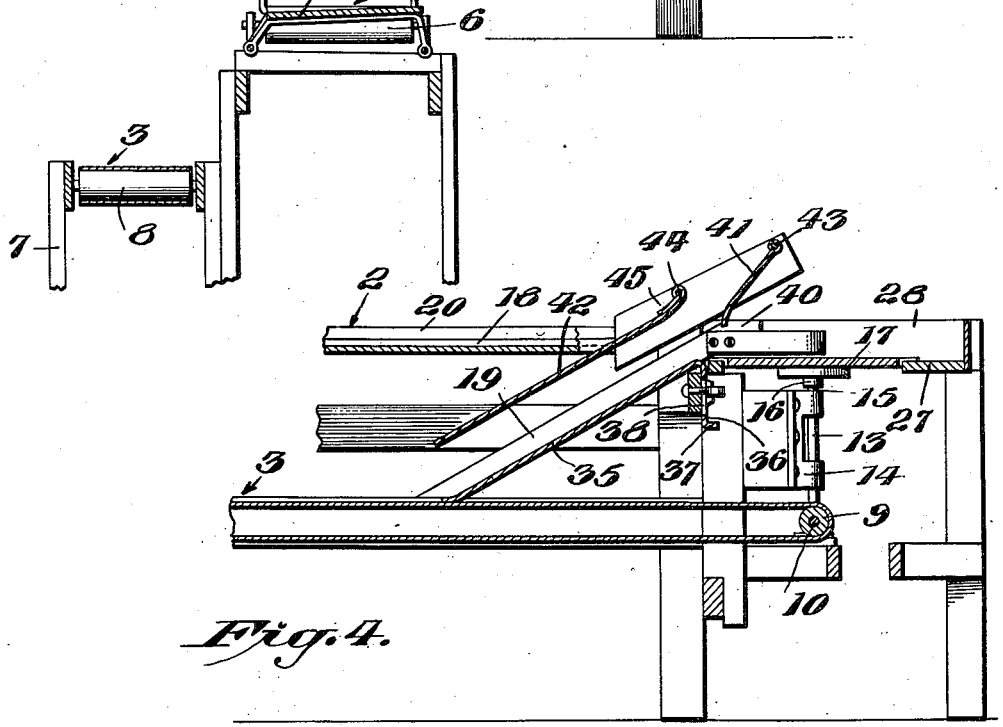

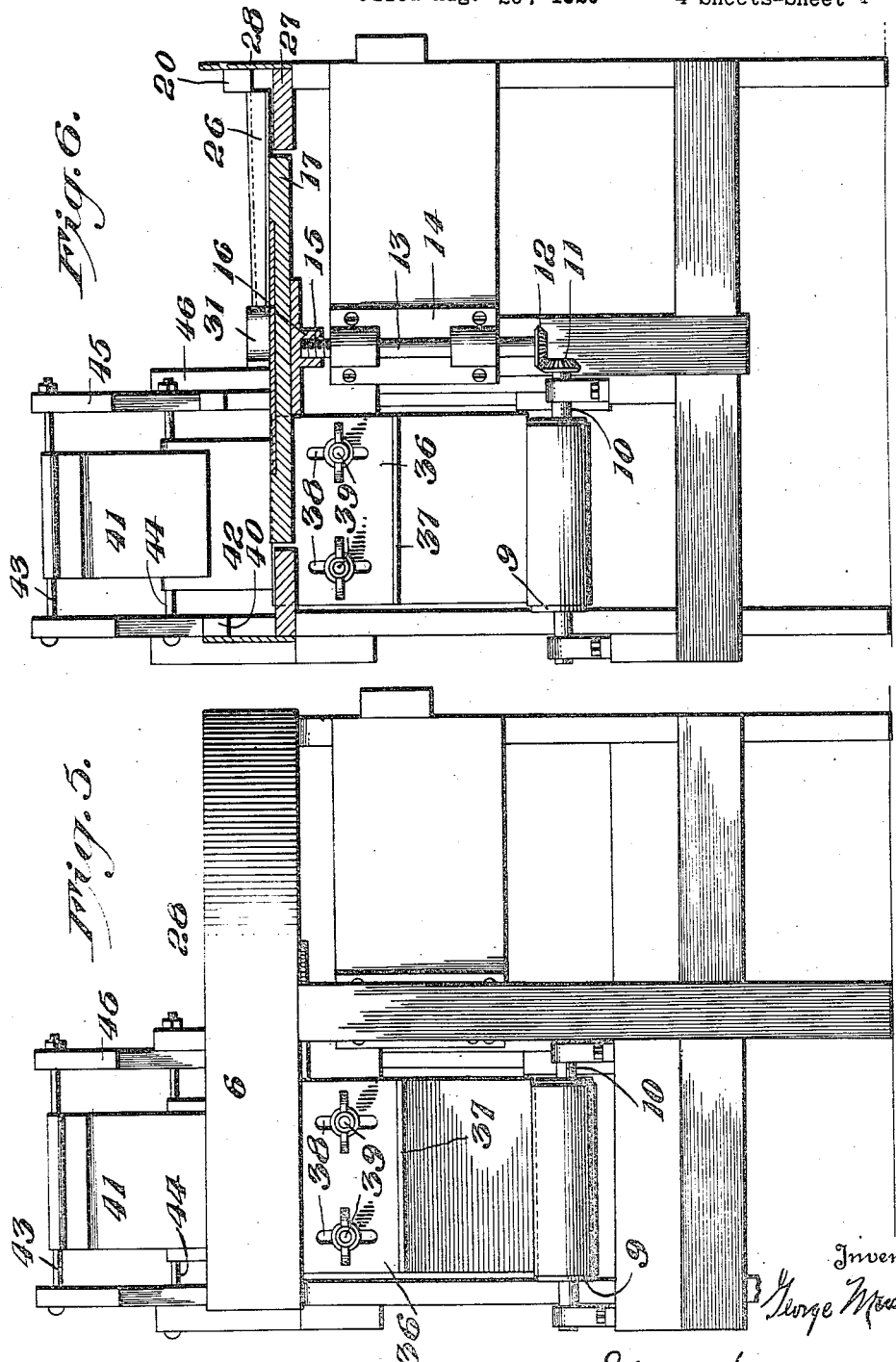

1,491,489

UNITED STATES PATENT OFFICE.

GEORGE MUELLER, OF SALT LAKE CITY, UTAH.

ATTACHMENT FOR BREAD-WRAPPING MACHINES.

Application filed August 20, 1920. Serial No. 404,752.

*To all whom it may concern:*

Be it known that I, GEORGE MUELLER, a citizen of the United States, residing at Salt Lake City, in the county of Salt Lake and State of Utah, have invented new and useful Improvements in Attachments for Bread-Wrapping Machines, of which the following is a specification.

The invention relates to a bread loaf conveyor attachment for bread wrapping machines.

The object of the present invention is to provide for bread wrapping machines a simple, practical and comparatively inexpensive attachment adapted to receive the wrapped loaves as they are discharged from the bread wrapping machine and capable of conveying the packages from the discharge end of the machine and returning the loaves to a point adjacent the feeding or receiving end of the bread wrapping machine whereby a sufficient time is afforded the packages for the setting of the sealing means and loss of wrappers reduced to a minimum, and one operator is enabled to alternately feed the machine and remove the wrapped loaves from the attachment thereby dispensing with one of the workmen ordinarily employed in connection with bread wrapping machines.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a side elevation of a bread loaf conveyor attachment constructed in accordance with this invention and shown applied to a bread wrapping machine.

Figure 2 is a plan view of a portion of the same.

Figure 3 is a longitudinal sectional view taken substantially on the line 3—3 of Figure 2.

Figure 4 is a similar view taken substantially on line 4—4 of Figure 2.

Figure 5 is a rear end elevation of the conveyor attachment.

Figure 6 is a transverse sectional view through the stationary table.

Figure 7 is a similar view through the inclined bridge plate.

Figure 8 is a detail sectional view illustrating the manner of mounting the adjustable guiding member of the rear end of the table.

In the accompaying drawings in which is illustrated the preferred embodiment of the invention, the conveyor attachment which is shown applied to a bread wrapping machine 1, comprises in its construction an upper longitudinal conveyor 2 and a lower conveyor 3 for carrying the packages 4 away from the discharge end of the machine and for returning them to the machine in a position adjacent to the receiving end of the bread wrapping machine to enable the bread to be fed into the bread wrapping machine and removed therefrom by one person without leaving his position at the place where the bread is fed into the bread wrapping machine. The upper conveyor 2 consists of an endless belt arranged on front and rear rolls 5 and 6 which are journaled in suitable bearings of a supporting framework of any desired construction. The lower endless conveyor 3 which operates in a lower plane than the upper endless conveyor 2, is located in front of the same and is preferably of greater length than the upper conveyor and it consists of an endless belt arranged on front and rear rolls 8 and 9 journaled in the said framework 7.

The rear roll 9 is mounted on a horizontal shaft 10 disposed transversely of the rear end of the conveyor attachment and connected at its inner end by vertical and horizontal beveled gears 11 and 12 with the lower end of a vertical shaft 13. The vertical shaft 13 which is preferably mounted in a bearing bracket 14 may be journaled and supported in any other suitable manner and its upper end 15 is threaded and is secured in a socket 16 interiorly threaded to receive the upper end 15 and depending from the rotary turn table 17 which extends from the rear portion of the lower conveyor and which is adapted to transfer the loaves from a table 18 at the rear end of the upper conveyor to an inclined chute 19 located above and extending downwardly to the rear portion of the lower conveyor. The table 18 which forms a stationary guide or way for the wrapped loaves, is inclined laterally and slants slightly downwardly and inwardly and is provided with inner and outer longitudinal side walls 20 and 21 for retaining the loaves on the table 18, which while shown in the drawings in a laterally inclined position, may be arranged in any other suitable position for enabling the loaves to be transferred from the upper endless conveyor to the turn table 17, which while shown arranged in substantially the plane of the upper conveyor, can be arranged at any point between the planes of the upper and lower conveyors.

The stationary table 18 may be mounted in any desired manner and the side wall 20 which extends forwardly a short distance beyond the end of the wall 21 is beveled at the ends at 22 and 23 and the other side wall 21 is provided with an extension 24 preferably constructed of sheet metal as shown and curved at its front terminal to form a flaring entrance to the space between the side walls. The upper conveyor delivers the wrapped loaves onto the front end of the table 18 which has its front end 25 beveled at the lower face to enable it to be arranged in close proximity to the traveling belt of the upper conveyor so that the loaves will readily pass onto the table or guide 18. The side walls 20 and 21 of the table or guide, preferably project slightly toward their rear ends for straightening the wrapped loaves so that the latter will be delivered on the turn table in proper position, the upper endless conveyor operating to slide the wrapped loaves from the stationary table 18, one loaf pushing another along the table 18 until the loaves reach the rotary turn table 17. The lateral inclination of the stationary table causes the loaves to hug the inner wall and enables the loaves to be guided by the said inner wall in the passage of the loaves from the stationary table to turn table. The rear end of the stationary table or guide 18 is equipped with an inclined extension or bridge plate 26 which overlaps the rotary turn table and also a curved platform 27 constituting a part of the framework 7 and provided with a curved wall 28 located at the outer edge of the platform 27 and extending from the rear end of the side wall 20 of the turn table 18 to the outer side wall of the inclined chute 19 and forming a guard. The bridge plate which is constructed of sheet metal, or other suitable material, extends from the rear end of the table 18 and is disposed at a slight lateral and longitudinal incline, its upper end being preferably secured to the upper face of the table 18 in the recess thereof and the lower end being supported by the turn table. The curved marginal platform or portion 27 is located in a plane slightly below the plane of the upper face of the turn table so that the wrapped loaves carried by the turn table will be held out of contact with the platform 27 to prevent friction which would result from the sliding of the loaves on the curved platform 27. As the greater portion of a loaf is arranged upon the turn table, there will be no liability of the loaves tipping and contacting with the curved platform while the loaves are being transferred from the stationary table to the inclined chute.

The inner side wall 21 constitutes a guide rail for directing the wrapped loaves or packages onto the turn table and it is equipped at its rear end with an adjustable guiding member 31 constituting a tip for the rear end of the wall 21 and composed of inner and outer sides 32 and 33 and a connecting end portion. The inner side presents an inclined or angularly related face and as the side wall 21 is set at an angle to the side edges of the conveyor belts an adjustment of the member 31 which is located adjacent to the central portion of the turn table, will cause the loaves to be delivered onto the turn table at different distances from the center thereof. The rear portions of the walls 20 and 21 extend beyond the bottom of table 18 and along the sides of the bridge plate or extension 26 and the rear portion of the inner wall 21 extends over the turn table from the periphery to a point adjacent the center of the same. The adjustable member 31 may be secured in its adjustment by bolts or any other suitable fastening means.

The turn table is located in approximately the plane of the upper end of the bottom of the inclined chute 19 and in order to enable the loaves to readily pass from the turn table down the inclined chute 19, the chute is equipped with an adjustable bottom member 34 consisting of an inclined portion 35 and a vertical portion 36 connected by a curved portion or bend with the inclined portion 35 and having its lower edge bent outwardly at 37 to form a grip or handle portion to facilitate the adjustment of the said member 34. The vertical portion 36 is provided with slots 38 through which pass clamping bolts 39 equipped with wing nuts adapted to clamp the member 34 in its adjustment. The member 34 is adapted to be raised or lowered to provide a smooth surface in proper position with relation to the turn table for enabling the packages to be delivered by the turn table to the chute without injury to the wrapper. The inner wall of the inclined chute 19 is provided with an upper extension 40 extending horizontally from the rotary turn table and adapted to guide the loaves so that they will be carried by the turn table over the upper end of the inclined chute and onto the latter.

One loaf forces another down the incline chute and the attachment is equipped at the chute with overhead plates or members 41 and 42 arranged at an inclination and hinged at their ends by transverse pivots 43 and 44 which are mounted in side walls or supports 45 preferably formed by arms of the framework extending upwardly and projecting rearwardly at an inclination at opposite sides of the inclined chute. The plates or members 41 and 42 are preferably constructed of sheet metal or they may be of any other suitable material, and the upper inclined hinged member 41 is adapted to check a loaf or package at the upper end of the incline chute and hold the same until the next succeeding package presses against the first package and forces the same onto the chute 19, and each loaf leaving the turn table will be squared with the preceding loaf. The wrapped loaves will be turned by the turn table and conveyed from the table to the chute and squared as before explained and presented in proper position to the chute and the overhead plates will operate as a yieldable top wall for the inclined chute and will maintain the wrapped loaves in proper position while traveling down the chute. The rotary movement of the turn table will positively feed the loaves which, when delivered by the inclined chute on the lower conveyor 3, will be carried forward by the same to the attendant. The conveyor attachment enables one attendant to feed the loaves into the bread wrapping machine and remove the wrapped loaves from the conveyor and dispense with one of the attendants ordinarily employed with bread wrapping machines. The conveyor attachment also by causing the wrapped loaves to travel along the belts of the conveyors and from one conveyor to the other, affords a more perfect sealing of the packages and reduces the amount of loss of paper as it has been found by experience that the loss of paper due to injury of the wrappers and improper sealing of the packages with an ordinary bread wrapping machine is practically eliminated by the conveyor attachment. The overhanging bridge plate or member 26 terminates with its end edge nearly radial of the rotary turntable so that the wrapped loaves will be delivered on to the turntable in a position substantially radially of the same. The loaves are carried around the turntable in this position from one side of the turntable to the other and are guided on to the chute by the plate or member 41 which retards or checks the loaves so that they will be delivered on to the inclined chute in a position transversely of the same. Also the plate 42 acts in a similar manner on the loaves as the same are transferred from the inclined chute on to the forwardly moving conveyor.

Any suitable gearing may be employed for transmitting motion to the upper and lower conveyors which are driven in opposite directions and the said conveyors are preferably geared to the bread wrapping machine and the turn table receives its motion from the lower conveyor by the bevel gears 11 and 12.

What is claimed is:—

1. A conveyor attachment for a bread wrapping machine, comprising a conveyor extending from the discharge end of the machine and having at its discharge end a stationary table over which wrapped loaves are forced by wrapped loaves on the said conveyor, a return conveyor extending to a point adjacent to the receiving end of the said machine and means for transferring the wrapped loaves from the stationary table to the return conveyor.

2. A conveyor attachment for a bread wrapping machine comprising a conveyor extending from the discharge end of the machine, a return conveyor arranged at a lower level than the said conveyor and extending to a point adjacent to the receiving end of the said machine, and means for transferring packages from one conveyor to the other, including a rotary turn table.

3. A conveyor attachment for a bread wrapping machine including a rearwardly traveling conveyor arranged to receive packages from the said machine, a forwardly traveling conveyor arranged to carry the packages to a point adjacent to the receiving end of the said machine, and means for transferring the packages from one conveyor to the other, said means including a stationary table extending from the rearwardly traveling conveyor and over which table packages are forced by packages carried by the said rearwardly traveling conveyor, and a turn table located at the rear end of the table.

4. A conveyor attachment for a bread wrapping machine including a rearwardly traveling conveyor arranged to receive packages from the said machine, a forwardly traveling conveyor arranged to carry the packages to a point adjacent to the receiving end of the said machine, means for transferring the packages from one conveyor to the other, said means including a stationary longitudinal table having spaced side walls and forming a continuation of the rearwardly traveling conveyor, and a turn table at the rear end of the stationary table.

5. A conveyor attachment for a bread wrapping machine including a rearwardly traveling conveyor arranged to receive packages from the said machine, a forwardly traveling conveyor arranged to carry the packages to a point adjacent to the receiving end of the said machine, means for transferring the packages from one conveyor to the other, said means including a stationary longitudinal table having spaced side walls one of the side walls being set at an angle and having a front extension forming a flaring entrance, and a rotary turn table located at the rear end of the stationary table.

6. A conveyor attachment for a bread wrapping machine including a rearwardly traveling conveyor arranged to receive packages from the said machine, a forwardly traveling conveyor arranged to carry the packages to a point adjacent to the receiving end of the said machine, means for transferring the packages from one conveyor to the other, said means including a stationary table extending longitudinally from the rear end of the rearwardly traveling conveyor, a rotary turn table, and a bridge plate extending from the stationary table and overlapping the turn table.

7. A conveyor attachment for a bread wrapping machine including a rearwardly traveling conveyor arranged to receive packages from the said machine, a forwardly traveling conveyor arranged to carry the packages to a point adjacent to the receiving end of the said machine, means for transferring the packages from one conveyor to the other, said means including a stationary table extending longitudinally from the rearwardly traveling conveyor and having side walls forming a guide, one of said walls having a projecting portion, a turn table located beneath the projecting portion of the said side walls, and adjustable means mounted on the said projecting portion for varying the effective length of the same.

8. A conveyor attachment for a bread wrapping machine including a rearwardly traveling conveyor arranged to receive packages from the said machine, a forwardly traveling conveyor arranged to carry the packages to a point adjacent to the receiving end of the said machine, means for transferring the packages from one conveyor to the other, said means including a stationary table extending longitudinally from the rearwardly traveling conveyor and having side walls forming a guide, the inner wall having a projecting portion, a turn table located beneath the projecting portion of the said side walls, adjustable means consisting of a tip mounted on the end of the side projecting portion of the said inner wall and movable inwardly and outwardly with respect to the same.

9. A conveyor attachment for a bread wrapping machine including a rearwardly traveling conveyor arranged to receive packages from the said machine, a forwardly traveling conveyor, and means for transferring the packages from one conveyor to the other including a rotary turn table and a stationary platform arranged concentric with the turn table and provided with guiding means.

10. A conveyor attachment for a bread wrapping machine including a rearwardly traveling conveyor arranged to receive packages from the said machine, a forwardly traveling conveyor, means for transferring the packages from one conveyor to the other including a rotary turn table, and a curved stationary platform arranged concentric with the turn table and provided with a curved outer wall forming a guide for the packages.

11. A conveyor attachment for a bread wrapping machine including a rearwardly traveling conveyor arranged to receive packages from the said machine, a forwardly traveling conveyor, means for transferring the packages from one conveyor to the other including a rotary turn table, a stationary curved platform arranged concentric with the turn table and having a curved outer wall forming a guide for the packages, and a chute extending from the turn table and the platform to the forwardly traveling conveyor.

12. A conveyor attachment for a bread wrapping machine including a rearwardly traveling conveyor arranged to receive packages from the said machine, a forwardly traveling conveyor, means for transferring the packages from one conveyor to the other including a rotary turn table, a stationary curved platform arranged concentric with the turn table and having a curved outer wall forming a guide for the packages, and a chute extending from the turn table and the platform to the forwardly traveling conveyor and provided at the inner side with an extension projecting over the turn table in spaced relation with the wall of the said platform.

13. A conveyor attachment for a bread wrapping machine including a rearwardly traveling conveyor arranged to receive packages from the machine, a forwardly traveling conveyor located in a plane below the rearwardly traveling conveyor, and means for transferring the packages from one conveyor to the other including a rotary turn table, and an inclined chute connecting the turn table with the forwardly traveling conveyor.

14. A conveyor attachment for a bread wrapping machine including a rearwardly traveling conveyor arranged to receive packages from the machine, a forwardly traveling conveyor located in a plane below the rearwardly traveling conveyor, and means for transferring the packages from one conveyor to the other including a rotary turn table, and an inclined chute extending downwardly from the turn table to the forwardly traveling conveyor.

15. A conveyor attachment for bread wrapping machines including a rearwardly traveling conveyor, a forwardly traveling conveyor, a rotary turn table, a stationary table extending from the rearwardly traveling conveyor to the turn table, and an inclined chute extending from the turn table to the forwardly traveling conveyor.

16. A conveyor attachment for bread wrapping machines including a forwardly traveling conveyor a turn table, an inclined chute extending from the turn table to the forwardly traveling conveyor, and an adjustable member having an inclined portion located at the upper end of the chute and adjustable upwardly and downwardly.

17. A conveyor attachment for bread wrapping machines including a forwardly traveling conveyor a turn table, an inclined chute extending from the turn table to the forwardly traveling conveyor, and an adjustable member located at the upper end of the chute and consisting of an inclined portion and a vertical attaching portion having means for adjusting the said member vertically and securing the same in the adjustment thereof.

18. A conveyor attachment for bread wrapping machines including a forwardly traveling conveyor a rotary turn table, an inclined chute extending from the turn table to the forwardly traveling conveyor, and a yieldably mounted plate located above the turn table at the upper end of the chute and arranged to check packages traveling down the said chute.

19. A conveyor attachment for bread wrapping machines including a forwardly traveling conveyor a rotary turn table, an inclined chute extending from the turn table to the forwardly traveling conveyor, and a pivoted inclined plate located above the turn table at the upper end of the chute.

20. A conveyor attachment for bread wrapping machines including a forwardly traveling conveyor a rotary turn table, an inclined chute extending from the turn table to the forwardly traveling conveyor, and an inclined yieldably mounted plate extending longitudinally of the chute in spaced relation with the same.

21. A conveyor attachment for bread wrapping machines including a forwardly traveling conveyor a rotary turn table, an inclined chute extending from the turn table to the forwardly traveling conveyor, and an inclined yieldably mounted plate located above the chute and in spaced relation with the same and pivoted at its upper end to swing downwardly and adapted to rest upon packages carried by the conveyor attachment.

22. A conveyor attachment for bread wrapping machines including a forwardly traveling conveyor a rotary turn table, an inclined chute extending from the turn table to the forwardly traveling conveyor, and a plurality of inclined plates located above the turn table and above the chute and pivoted at their upper ends and arranged to rest upon packages carried by the conveyor attachment.

23. A conveyor attachment for bread wrapping machines including a rearwardly traveling conveyor, a forwardly traveling conveyor a stationary table extending rearwardly from the rearwardly traveling conveyor, a rotary platform, a stationary curved platform arranged concentric with the platform, an inclined chute extending downwardly from the rotary platform to the forwardly traveling conveyor, and a bridge plate extending from the stationary table and overlapping the rotary platform.

24. A conveyor attachment for a bread wrapping machine including a rearwardly traveling conveyor arranged to receive packages from the said machine, a forwardly traveling conveyor arranged to carry the packages to a point adjacent to the receiving end of the said machine, and means for transferring the packages from one conveyor to the other, the latter means including a stationary longitudinal table inclined laterally and having spaced side walls, and a turn table located on the rear end of the stationary table.

25. A conveyor attachment for a bread wrapping machine including a rearwardly traveling conveyor arranged to receive packages from the said machine, a forwardly traveling conveyor arranged to carry the packages to a point adjacent the receiving end of the said machine, and means for transferring the packages from one conveyor to the other, the latter means including a stationary table extending longitudinally from the rear end of the rearwardly traveling conveyor, a rotary turn table, and a bridge plate extending from the stationary table to the conveyor and inclined longitudinally.

26. A conveyor attachment for a bread wrapping machine including a rearwardly traveling conveyor arranged to receive packages from the said machine, a forwardly traveling conveyor arranged to carry the packages to a point adjacent the receiving end of the said machine, and means for transferring the packages from one conveyor to the other, the latter means including a stationary table inclined laterally and extending longitudinally from the rearwardly traveling conveyor, a rotary turn table and a laterally inclined bridge plate extending from the stationary table to the rotary turn table.

27. A conveyor attachment for a bread wrapping machine including a rearwardly traveling conveyor arranged to receive packages from the said machine, a forwardly traveling conveyor arranged to carry the packages to a point adjacent the receiving end of the said machine, and means for transferring the packages from one conveyor to the other, the latter means including a stationary table inclined laterally and extending longitudinally from the rearwardly traveling conveyor, a rotary turn table and a laterally inclined bridge plate extending from the stationary table to the rotary turn table, said bridge plate being also inclined longitudinally.

28. A conveyor attachment for bread wrapping machines including a rearwardly traveling conveyor, a forwardly traveling conveyor, and means for transferring packages from one conveyor to the other including a rotary turn table, and a stationary platform arranged concentric with the turn table and located below the upper face of the said turn table to prevent the packages from coming in contact with the platform.

29. A conveyor attachment for bread wrapping machines including a rotary turn table, an inclined chute arranged to receive loaves from the turn table, and means for squaring the loaves with one another as they are delivered from the turn table to the chute.

30. The combination with a bread wrapping machine, of conveying means arranged to receive wrapped loaves of bread from the said machine at the point of discharge thereof and to carry the wrapped loaves away from the point of discharge of the said machine to a point adjacent to the end of the said machine, whereby the person feeding the machine may remove the wrapped loaves therefrom without leaving his position at the said receiving end.

31. A conveyor attachment for a bread wrapping machine, including a rotary turntable, conveying means extending from the discharge end of the machine to the turntable and provided thereat with means for delivering wrapped loaves on to the turntable in a position substantially radially of the same, and conveying means arranged to receive the loaves from the opposite side of the turntable for conveying the said loaves to a point adjacent to the machine.

32. A conveyor attachment for a bread wrapping machine, including a rotary turntable, conveying means extending from the discharge end of the machine to the turntable and provided thereat with a bridge plate extending over the turntable at one side thereof and terminating in a position for delivering wrapped loaves on to the turntable substantially radially of the same, and conveying means located at the opposite side of the turntable for carrying the wrapped loaves to a point adjacent to the machine.

33. A conveyor attachment for a bread wrapping machine, including a rotary turntable, a rearwardly traveling conveyor arranged to receive wrapped loaves from the machine and provided with means for delivering the wrapped loaves on to the rotary turntable, a forwardly traveling conveyor located adjacent the opposite side of the turntable for carrying the wrapped loaves to a point adjacent the machine said forwardly traveling conveyor being arranged at a lower elevation than the rearwardly traveling conveyor, an inclined chute extending from the turntable to the forwardly traveling conveyor, and means located at the upper end of the chute for checking the wrapped loaves and for guiding the same on to the inclined chute in a position transversely thereof.

34. A conveyor attachment for a bread wrapping machine, including a rotary turntable, a rearwardly traveling conveyor arranged to receive wrapped loaves from the machine and provided with means for delivering the wrapped loaves on to the rotary turntable, a forwardly traveling conveyor located adjacent the opposite side of the turntable for carrying the wrapped loaves to a point adjacent the machine, said forwardly traveling conveyor being arranged at a lower elevation than the rearwardly traveling conveyor, an inclined chute extending from the turntable to the forwardly traveling conveyor, and means located at the lower end of the chute for retarding the wrapped loaves and for guiding the same on to the forwardly traveling conveyor in a position transversely thereof.

35. A conveyor attachment for a bread wrapping machine, including a rotary turntable, a rearwardly traveling conveyor arranged to receive wrapped loaves from the machine and provided with means for delivering the wrapped loaves on to the turntable in a position substantially radially of the same, a forwardly traveling conveyor located at the opposite side of the turntable at a lower elevation than the rearwardly traveling conveyor, an inclined chute extending from the turntable to the forwardly traveling conveyor, and means located at the upper and lower ends of the inclined chute for checking and retarding the wrapped loaves to guide the same on to the chute and on to the forwardly traveling conveyor in a position transversely of the same.

36. A conveyor attachment for a bread wrapping machine, including a rotary turntable, conveying means extending from the discharge end of the machine to the turntable, an inclined chute extending downwardly from the turntable and adapted to receive wrapped loaves therefrom, and a plate located at the upper end of the chute and pivoted at its upper portion above the turntable and having its lower portion extending into the path of the loaves and arranged to engage and bear upon the same.

37. A conveyor attachment for a bread wrapping machine, including a rotary turntable, conveying means extending from the discharge end of the machine to the turntable, an inclined chute extending from the turntable and a plate pivotally hung at the upper end of the inclined chute and extending into the path of wrapped loaves carried by the conveyor for checking the said wrapped loaves, and conveying means extending forwardly from the lower end of the inclined chute.

38. The combination with a bread wrapping machine, of conveying means arranged to receive wrapped loaves of bread from the said machine, said conveying means having portions traveling in opposite directions, and a connecting bend whereby the wrapped loaves are carried from the point of discharge and returned to a position adjacent the feeding means of the machine.

In witness whereof, I have hereunto affixed my signature.

GEORGE MUELLER.